(12) United States Patent
Gray et al.

(10) Patent No.: US 7,058,167 B2
(45) Date of Patent: Jun. 6, 2006

(54) AUTOMATIC LOCATION-AWARE FEATURE SELECTION

(75) Inventors: Thomas Gray, Carp (CA); Christian Szpilfogel, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 546 days.

(21) Appl. No.: 10/302,119

(22) Filed: Nov. 22, 2002

(65) Prior Publication Data

US 2003/0099340 A1 May 29, 2003

(30) Foreign Application Priority Data

Nov. 29, 2001 (GB) .............................. 0128595

(51) Int. Cl.
*H04M 3/42* (2006.01)

(52) U.S. Cl. .................... 379/201.06; 379/201.07; 379/201.1

(58) Field of Classification Search ............ 379/201.06, 379/201.01, 201.02, 201.03, 201.07, 201.09, 379/201.1, 211.01, 211.02
See application file for complete search history.

(56) References Cited

U.S. PATENT DOCUMENTS 4,752,951 A    6/1988   Konneker ............... 379/201.07
5,138,655 A *  8/1992   Takashima et al. ......... 379/157
6,373,817 B1 * 4/2002   Kung et al. ................. 370/217
6,700,966 B1 * 3/2004   Takagi et al. .......... 379/201.06

FOREIGN PATENT DOCUMENTS

EP          0 932 099 A      7/1999
GB          2 353 612 A      2/2001
WO          WO 95/23478 A1   8/1995
WO          WO 99/09533 A1   2/1999

* cited by examiner

*Primary Examiner*—Benny Q. Tieu
(74) *Attorney, Agent, or Firm*—William J. Sapone; Henry Coleman; R. Neil Sudol

(57) ABSTRACT

A system is provided for automatic feature enablement on the basis of a user's current location, in order to enable the most appropriate set of features. The system is implemented within a tuple space for allowing communication among system components. A location service is provided for tracking the location of a user. Policy daemons are created which contain user specified policies to select appropriate feature sets depending on the user's location. An interface is provided for specifying user preferences for features depending on location. Finally, a basic PBX feature architecture is used which consists of a database to hold individual user feature selections as a set of tuples and a call processing system which uses these feature selections.

4 Claims, 1 Drawing Sheet

AUTOMATIC LOCATION-AWARE FEATURE SELECTION

FIELD OF THE INVENTION

This invention relates generally to communication systems such as PBXs, and more particularly to a system for automatically enabling communication features based on the location of a user within the environment of the communication system.

BACKGROUND OF THE INVENTION

PBX features are in large part designed to provide the user with the ability to specify how communications should be handled when the user is away from his/her office or desk. For example a user may specify that calls should not be directed to his/her telephone but should be immediately rerouted to a voice mail account. This capability allows for efficient communications within the organization that the PBX serves. However, according to the prior art, the user is required to manually set up and enable such services via his/her desk telephone. Active set up and enablement of such features is often a hindrance for a busy worker who, for example, may be hurrying to a meeting. Often times the user will forget to set the features up in the most advantageous way, which decreases the value of the PBX feature set.

One approach to overcoming this problem is set forth in U.S. Pat. No. 5,454,032—'Method of establishing communication link to one of multiple devices associated with single telephone number' by Pinard, Raju and Rehder, wherein a 'one-number' system is used to ring many telephones at the same time or in sequence, in the hope of locating the user. Such prior art 'one-number' systems do not provide the full flexibility of most PBX feature sets.

SUMMARY OF THE INVENTION

According to the present invention, a system is provided for automatic feature enablement on the basis of the user's current location, in order to enable the most appropriate set of features. The system is implemented within a tuple space for allowing communication among system components. A location service is provided (e.g. a wireless device such as a Bluetooth appliance, or a card reading registration system, telephone based registration etc.) for tracking the location of a user. Policy daemons are created which contain user specified policies to select appropriate feature sets depending on the user's location. An interface is provided for specifying user preferences for features depending on location. Finally, a basic PBX feature architecture is used which includes a database to hold individual user feature selections as a set of tuples, and a call processing system which uses these feature selections.

According to an important aspect of the invention, the elements set forth above operate outside of the standard PBX call processing environment. The invention therefore enjoys the advantage of providing a low risk extension to product functionality. There is no detrimental effect on the complexity of call processing. Instead, a simple decision is made as to the appropriate feature sets depending on the user's current location. Consequently, the system according to the present invention may be deployed "behind" any manufacturer's PBX which includes the necessary functionality to set a particular user's features.

BRIEF DESCRIPTION OF THE DRAWINGS

A detailed description of the invention is set forth herein below, with reference to the sole drawing, which is a block diagram of an architecture for automatic feature selection based on user location, according to the preferred embodiment.

DETAILED DESCRIPTION OF THE PREFERRED EMBODIMENT

Figure 1:
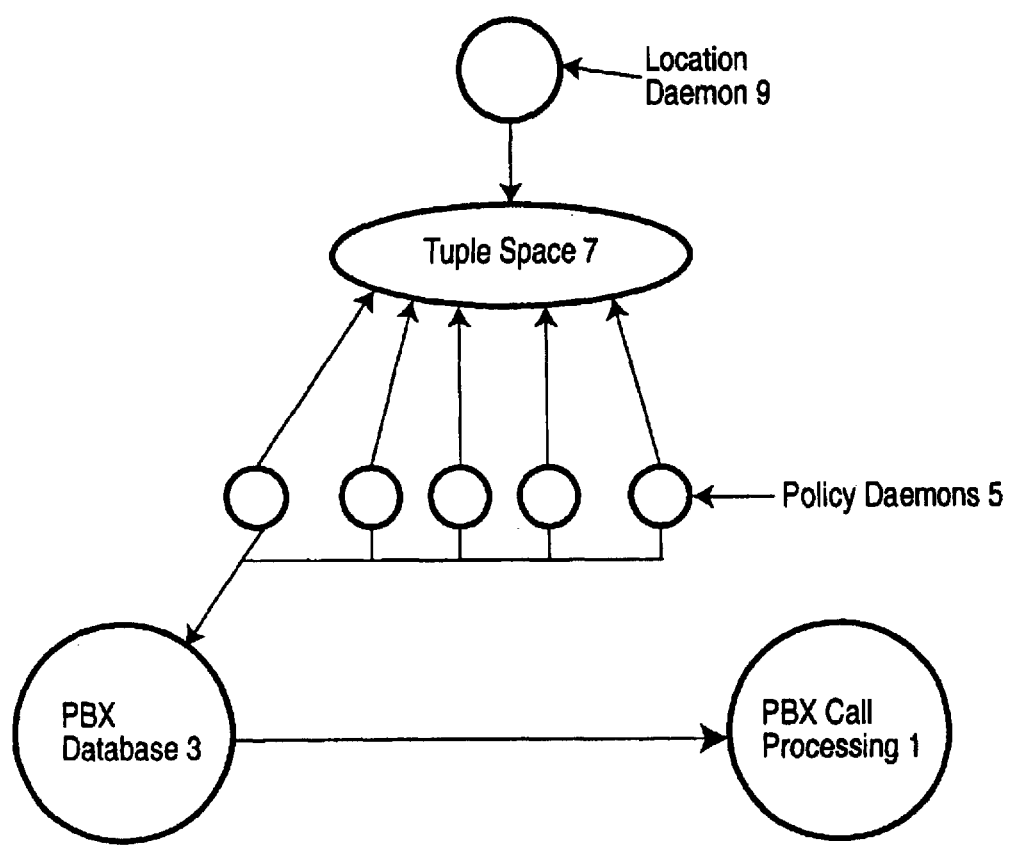

Before discussing the invention is detail, a brief introduction is set forth below of the basic structure and operation of a tuple space.

A tuple space is a set of type/value ordered pairs called ingles. Each ingle consists of a type (e.g. Name) and a value (e.g. John Doe). Thus, a tuple which describes an employee for a company could, for example, be:

{:name John Doe :age 37 :employee_number 12345 :start_date 810126 :position T12}

The tuple space enables coordination by allowing queries based on the matching of tuples by anti-tuples. An anti tuple is a tuple that can be used as a query in the tuple space. In form, it is identical to a tuple except that the value of any or all fields may be replaced by a '?' which indicates a 'don't care' condition. Tuple spaces are set up to match tuples with anti-tuples which agree in all fields except for the one(s) indicated by the ? query, which acts as a "wild card". Thus the anti tuple:

{:name ?:age 37 :employee_number ?:start_date ?:position T12} would return the tuples for all employees of position T12 who are 37 years old.

Operations on the tuple space include:

Poke—place a tuple in the tuple space. Duration may be specified for how long the tuple should remain in the space. This may be any period up to indefinite.

Peek—query the tuple space with an anti-tuple. This query may be specified to last for any period up to indefinite. Copies of matching tuples are returned through the interface and the tuples remain in the tuple space.

Pick—query the tuple space with an anti-tuple. This query may be specified to last for any period up to indefinite. Copies of matching tuples are returned through the interface and the tuples are removed from the tuple space.

Cancel—with a specified anti-tuple. All matching anti-tuples are removed from the tuple space. Tuples themselves may be removed directly by an appropriate pick request.

Additional operations may be provided such as disclosed in UK Mitel Patent Application No. Mitel #520 entitled 'Tuple Space Operations for Fine Grained Control'.

Turning to the block diagram, with respect to feature control a PBX feature architecture consists of a call processing system 1 that uses feature set up and enabling information from a database 3 to modulate its service to a user. The database 3 stores records that indicate if and how individual users prefer each PBX feature to behave. The feature interaction between multiple features is handled internally by call processing 1 and does not form part of the present invention. For example, if both Call-Forward-Busy and Call-Waiting are enabled on a busy telephone, a decision must be made within call processing 1 as to which feature will be selected since the operating of these features are mutually exclusive—with Call-Forward-Busy the call is directed to another end point whereas with Call-Waiting the call waits at the original end-point. Systems are known for handling feature interaction, all of which are outside the present scope of invention. The present specification addresses only the set up and enabling of features.

As indicated above, the database 3 contains a set of records for each user which indicate how features are to be set up and whether they have been enabled. For the purposes of this disclosure the records consist of a set of key-value pairs which identify the feature, whether it is enabled or not and, if necessary, other information important to that feature. Examples of Such Feature Records Are:
<Feature><Call-Forward-Always>, <Enabled><Yes>, <Forwarding-Number><1742>
<Feature><Call-Forward-Busy-Internal>, <Enabled><Yes>, <Forwarding-Number><1112>
<Feature><Call-Forward-Busy-External>, <Enabled><Yes>, <Forwarding-Number><2397>
<Feature><Do-Not-Disturb>, <Enabled><Yes>

A user's selected feature set comprises a collection of such records that indicate how the user wishes his/her features to behave. Typically, a user will have several different types of feature sets stored for use. As an example, a user may wish to invoke different feature sets for different conditions or circumstances, such as:

1. Away from the office (i.e.—not in building)
2. In a meeting room
3. At another person's desk
4. In an executive office
5. In the cafeteria
6. In the washroom
7. . . . etc.

Currently, a user must maintain a mental or written list of the necessary feature selections and then manually set up the features in the database 3 prior to each change in condition or circumstance. Since repeatedly enabling and disabling features can be a time consuming and non-trivial task, in many cases the user does not bother to do so. For example, a user who is hurrying to an important meeting will be hesitant to take the time to enable the proper set of features. In many cases the task is neglected and the user loses the advantages in connectivity provided by the PBX feature set. The present invention addresses this problem and eases the burden of feature selection on the user and hence increases the values of the feature set to him/her. This, in turn, improves the efficiency of the enterprise within which the user functions and consequently increases the attractiveness and value of the vendor's PBX technology in the market place.

According to the present invention, each user is provided with a policy daemon 5, which, among, other things has a link to the PBX database 3 for the purpose of setting up the user's feature selection records to any desired state, as discussed in greater detail below.

Location information for each user is gathered by a location daemon 9 and is placed in the tuple space 7 in a raw format. The precise mechanism of how location is determined is outside of the scope of the present invention. Indeed multiple types of registration may be used, as discussed above. For example, wireless detection mechanisms may be employed using smart badges or Bluetooth devices. Card readers may be provided in meeting rooms by which a user can register his/her presence. The user may also register his/her presence by dialing a special feature in the PBX. In any event the location daemon 9 places tuples in the tuple space 7 of the basic form:
<User><Unique name for User>,
<Status><a description of the user's current location>.
<Directory_Number><directory number for that location>

As used in the present description, a policy may be defined as a condition-action pair. Conditions in this context are assertions that are placed in the tuple space 7 by the user's location daemon 9, the user's policy daemon 5, or by another policy daemon. Detection of a condition specified in a policy triggers an associated action, which for the present invention means either placing an assertion in the tuple space 7, or updating a user record in the PBX database 3.

The user is provided with a user interface and associated management tool for specifying the feature sets that the user wishes to have, given one of the circumstances listed above. The provision of such a user interface would be well known to a person of ordinary skill in the art. Thus, the user may wish to indicate that:
  if he/she is in a meeting room, all calls should be forwarded to voice mail number
  if he/she is at someone else's desk, calls should be forwarded to that desk
  if he/she is in the cafeteria, a paging announcement should be made
  if he/she is in a executive's office, disable the ringer on his/her wireless telephone
. . . etc.

As discussed above, each user is provided with a set of policy daemons 5 which define user feature sets using policy objects which are stored in the database 3. The management of policy objects and how policies are passed to them is well-known in the art and is therefore described only conceptually herein. It should be noted that the policy objects should contain the appropriate policies at any time.

In each policy object a set of policies is provided in the form shown below for monitoring the tuple space 7 to detect changes in the location status for its user:

```
<Policy_Name><In a meeting room>,
<Anti-Tuple>   <
                <User><Unique name for User>
                <Status><In a meeting room>
                <?Directory_Number><?>
               >
<Action>       <
                <Feature><Call-Forward-Always>,
                <Enabled><Yes>,
                <Forwarding-Number><?Directory_Number>
               <
<Action>       <
                <Feature><. . . .
```

Each of these policy daemons 5 monitors the tuple space 7 for a specific change in the user location status and in response sets the PBX database 3 to the selections of features that most suitably serve that status. The policy object set forth above includes a name, followed by a description of the anti-tuple that should be placed in the tuple space 7 to detect the change in status. One or more actions indicate how the features should be set up in the PBX database 3. In the anti-tuple a value is provided which is indicated as ?Directory_Number. This is the usual syntax to indicate that the value to be placed there is the value that is returned in the tuple that is associated with the key of the associated name.

Thus, in operation, the policy daemon 5 for a user places the appropriate anti-tuples in the tuple space 7. When the location daemon 9 detects a change in user location status it first 'de-bounces' this information to ensure that it is not a momentary trivial change and when this is satisfied places the new information in the tuple space 7. This triggers the appropriate policy daemon 5 to set up the PBX database 3. New calls to the user then utilize the feature set which is most appropriate to the user's current location.

For the embodiment described herein, the PBX database 3 may be set up directly by writing records into it. For heterogeneous PBX's other methods may be used by the policy daemons 5, including simulating manual user input.

Variations and modifications of the invention are contemplated. All such alternative embodiments are believed to fall within the sphere and scope of the invention as defined by the appended claims.

What is claimed is:

1. A system for automatic feature enablement based on the current location of a user, comprising:
   a tuple space for allowing communication among system components;
   a location daemon for tracking the location of said user and posting tuples to said tuple space indicative thereof;
   an interface for specifying user preferences for features depending on said location;
   at least one policy daemon for receiving said user preferences and in response peeking said tuple space with anti-tuples to determine the location of said user and creating policy objects to select predetermined feature sets depending on the location of said user; and
   a PBX feature architecture having a database for storing said predetermined feature sets and a call processing system for implementing PBX features in accordance therewith.

2. The system of claim 1, wherein said policy objects each comprise a name followed by at least one of said anti-tuples for detecting change in location of said user and at least one action for specifying set up of said feature sets in said database.

3. A method of automatic feature enablement based on the current location of a user, comprising:
   tracking the location of said user and posting tuples to a tuple space indicative thereof;
   receiving user preferences for features depending on said location;
   peeking said tuple space with anti-tuples to determine the location of said user
   creating policy objects to select predetermined feature sets depending on the location of said user;
   storing said predetermined feature sets; and
   implementing PBX features in accordance therewith.

4. The method of claim 3, wherein said policy objects each comprise a name followed by at least one of said anti-tuples for detecting change in location of said user and at least one action for specifying set up of said feature sets in said database.

* * * * *